United States Patent [19]

Hsieh

[11] Patent Number: 4,993,061
[45] Date of Patent: Feb. 12, 1991

[54] PORTABLE MINIATURE HIGH FIDELITY STEREO TAPE PLAYER AND CORDLESS RADIO TELEPHONE SYSTEM

[76] Inventor: Sheng-Yu Hsieh, 3Fl., No. 48, Sec. 2, Chung Chen Rd., Shih-lin, 11125, Taipei, Taiwan

[21] Appl. No.: 382,443

[22] Filed: Jul. 20, 1989

[51] Int. Cl.$^5$ ............................................. H04Q 7/04
[52] U.S. Cl. ........................................ 379/61; 379/58
[58] Field of Search .................. 379/61, 62, 58; 369/6

[56] References Cited

U.S. PATENT DOCUMENTS 4,591,661 5/1986 Benedetto .............................. 379/61

Primary Examiner—Jin F. Ng
Assistant Examiner—M. Shehata
Attorney, Agent, or Firm—Bacon & Thomas

[57] ABSTRACT

A portable high fidelity tape player and cordless radio telephone system includes a base unit, a handset unit and a stereo unit, in which the stereo unit includes a carrier filter, a carrier receiver, a pilot tone filter, a pilot tone decoder, a modulation circuit, a set of pilot tone oscillators, and a set of integrated circuits. When a ringing signal in the service line enters the base unit while the stereo unit is playing a recording tape, the operation of the motor of the stereo unit stops and the listener is enabled to proceed with the telephone conversation. Upon completing the conversation or after the party at the end of the line has hung up, the stereo unit returns to its operating state and the user may resume listening to the recording tape.

4 Claims, 6 Drawing Sheets

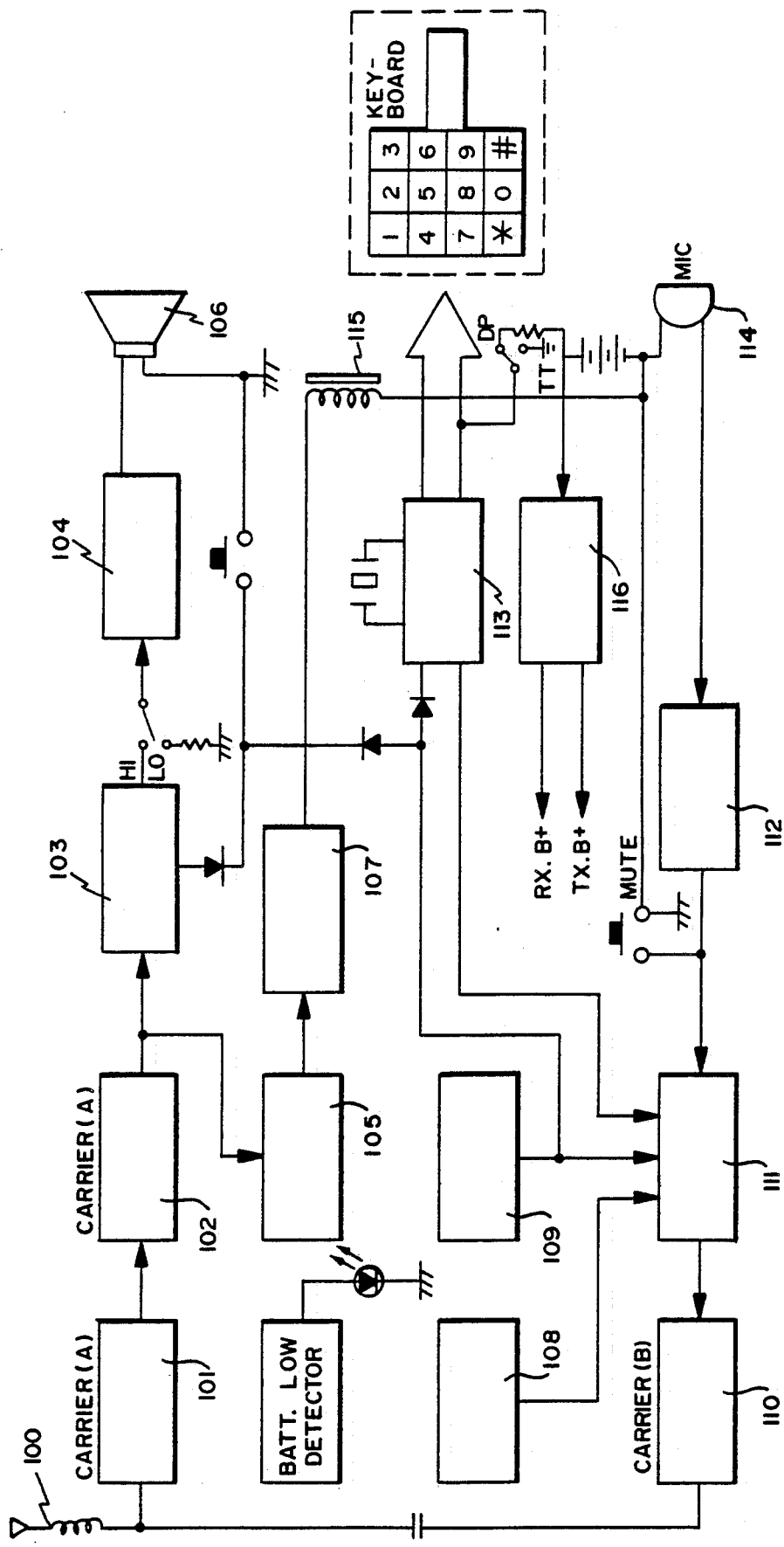
F I G. 1

PORTABLE MINIATURE HIGH FIDELITY STEREO TAPE PLAYER AND CORDLESS RADIO TELEPHONE SYSTEM

BACKGROUND OF THE INVENTION

The present invention relates to a miniature high fidelity stereo cassette type apparatus of the type designed to be played through earphones and at the same time carried by the listener while the listener is also engaged in other activities such as housework, exercise, sports and commuting. In particular, the present invention relates to such a personal stereo system in combination with a cordless telephone.

As a result of rising living standards, the demand for high fidelity sound has increased. Personal high fidelity stereo systems such as the Sony WALKMAN TM, have attained widespread popularity because of their convenience and the privacy they offer to the user. Students and pedestrians, automobile passengers, persons cooking in their kitchen or doing housework, and numerous others are seen going about their business with earphones inserted in their ears.

One problem with such personal stereos, however, is that while the users (especially those working at home) are wearing, the earphones, telephone calls may be missed because the user is unable to hear the ringing of the telephone.

SUMMARY OF THE INVENTION

In view of the above problem with earphone-type personal stereo systems, an object of the present invention is to provide a portable earphone-type stereo system of the type discussed above which does not cause the user to miss any telephone calls.

The portable stereo and telephone combination provided by the present invention not only includes a device which plays stereo sounds, but also includes the base unit and hand set of an ordinary cordless radio telephone, so that people people can hear a telephone call by means of the radio, without affecting ordinary use of the stereo. As a result, earphone wearers are able to enjoy their music without missing any telephone calls.

The present invention will become more readily apparent from the following description of the preferred embodiment of the present invention, taken in conjunction with the accompanying drawings.

BRIEF DESCRIPTION OF THE DRAWINGS

FIG. 1 is a block diagram of the circuit of the hand set of the present invention.

DETAILED DESCRIPTION OF THE PREFERRED EMBODIMENT

Referring to the above figures, the portable stereo cassette player and cordless telephone transceiver of the present invention includes a hand set unit, a base unit, and a portable personal stereo unit.

Figure 4:
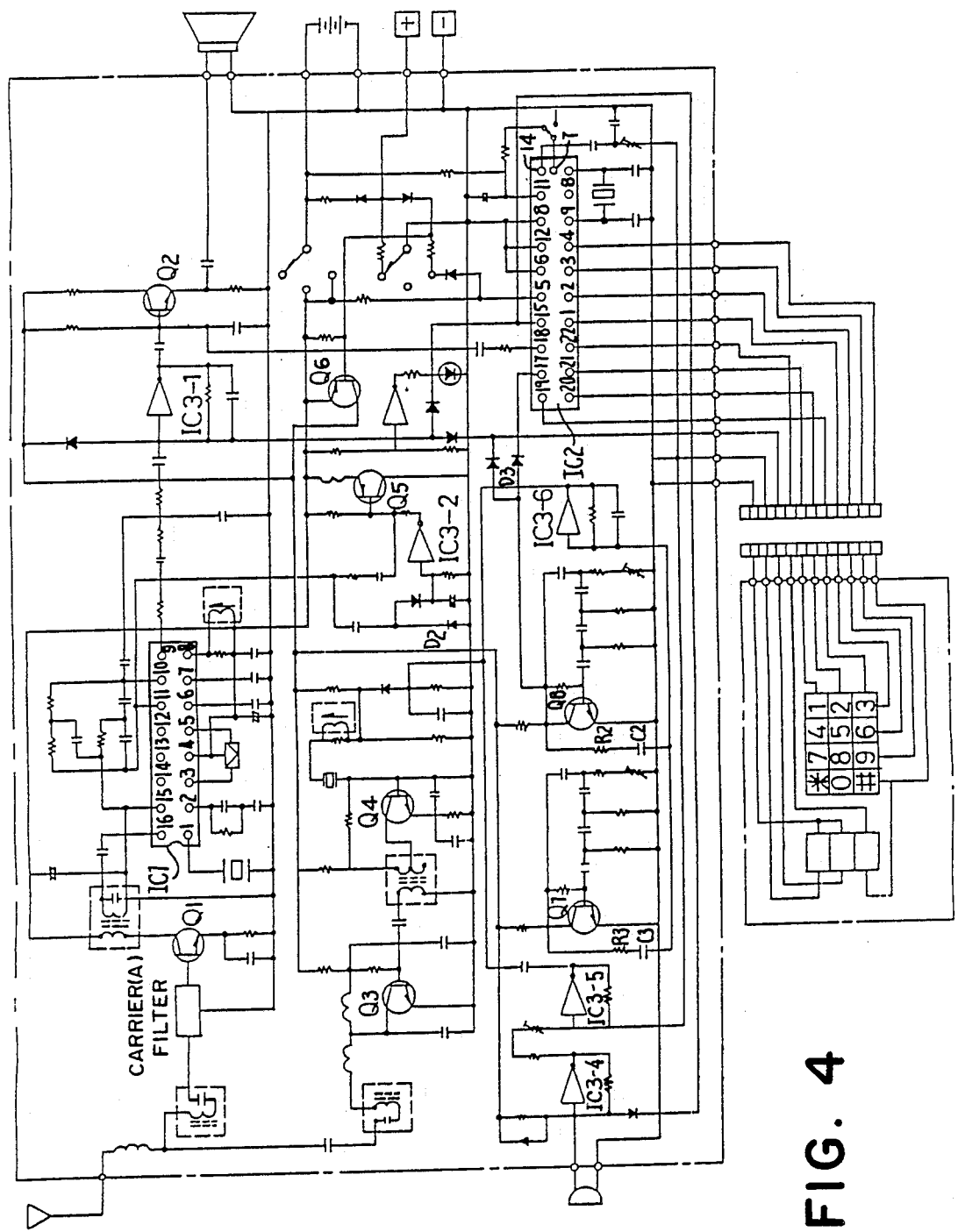
FIG. 4 is a practical example of the circuit of the hand set of the present invention.

As shown in FIGS. 1 and 4, the hand set unit includes an antenna 100 for receiving a signal carrier A and for transmitting a signal carrier B respectively from and to the base unit, and a filter 101 for the carrier A. Filter 101 is a band pass filter connected to antenna 100, and is matched with the frequency of carrier A. Filter 101 serves not only to increase the rejection ratio of the hand set against the adjacent channel, but also to prevent interruption of the carrier A caused by carrier B.

The output of filter 101 is connected to receive 102, which includes amplificaion transistor Q1 and integrated circuit IC1, as shown in FIG. 4. After carrier A is received via antenna 100, it is passed through filter 101, amplified by transistor Q1, and then sent to integrated circuit IC1 which differentiates the carrier frequency and separates the audio signal from the carrier.

The output of receiver 102 is divided into two branches, one of which is connected to audio preamplifier 103 and power amplifier 104, and the other to bell signal filter 105 and bell amplifier 107. The output of power 104 is connected to a hand set speaker 106. The audio signal output by the integrated circuit IC1 of the receiver 102 is linked with and amplified by the integrated circuit IC3-1 of the audio preamplifier 103, as shown in FIG. 4, and then passed through transistor Q2 of power amplifier 104 to drive speaker 106.

The other audio signal output from IC1 is linked and sent to the tenth pin of IC1, then picked by bell filter 105, a double T type filter formed by pins 10 and 11 of IC1 and also by the peripheral resistance and capacitance, after which it is amplified by the OP amplifier connected between pins 10 and 11, and output from pin 11 to be coupled with diodes D1 and D2 which perform a double voltage rectification. The rectified signal then passes through the integrated circuit IC3-2. of the bell amplifier 107 and the transistor Q5 to drive buzzer 115, which provides the ringing sound for alerting the listener of an incoming telephone call.

Referring again to FIGS. 1 and 4, antenna 100 of the hand set of the present invention is also connected to transmitter 110 for transmitting carrier B to the base unit. Transmitter 110 is connected to the output of modulation circuit 111, which is connected to the outputs of the pilot tone generators 108 and 109, tone/pulse dialer 113, and microphone amplifier 112.

Handset microphone 114 which transmits an audio signal to microphone amplifier 112 is controlled by talk and power switch 116. When the talk and power switch 116 is turned to the TALK position, transistor Q6 outputs a bias voltage to transistors Q7 and Q8 for oscillating respective pilot tone generators 108 and 109's signals, which are linked to modulation circuit 111 by resistance-capacity circuits R2, C2, R3 and C3. The positive bias voltage at the collector of transistor Q6 is supplied to the microphone amplifier 112, in which the signal is amplified by integrated circuits IC3-4 and IC3-5 before being provided to modulation circuit 111.

The positive voltage output by transistor Q6 is also supplied to transmitter 110 and modulation circuit 111, including transistor Q4 which oscillates the signal in order to generate a signal in carrier B's frequency. The carrier B frequency signal is then amplified by transistor Q3 and coupled to antenna 100 for transmittal.

As shown in FIG. 4, the preferred embodiment of tone/pulse dialer 113 is an integrated circuit IC2. After a signal from the keyboard of the handset is amplified by integrated circuit IC3-5 and sent to IC2, the DTMF signal is transmitted via IC2's 14th pin to modulation circuit 111, after which a pulse signal at the 17th pin of IC2 is passed through diode D3 to control the bias voltage of transistor Q8 such that the oscillation of pilot tone generator 109 will be switched on and off. The resulting signal is sent to the base unit via antenna 100 for the purpose of dialing.

Figure 2:
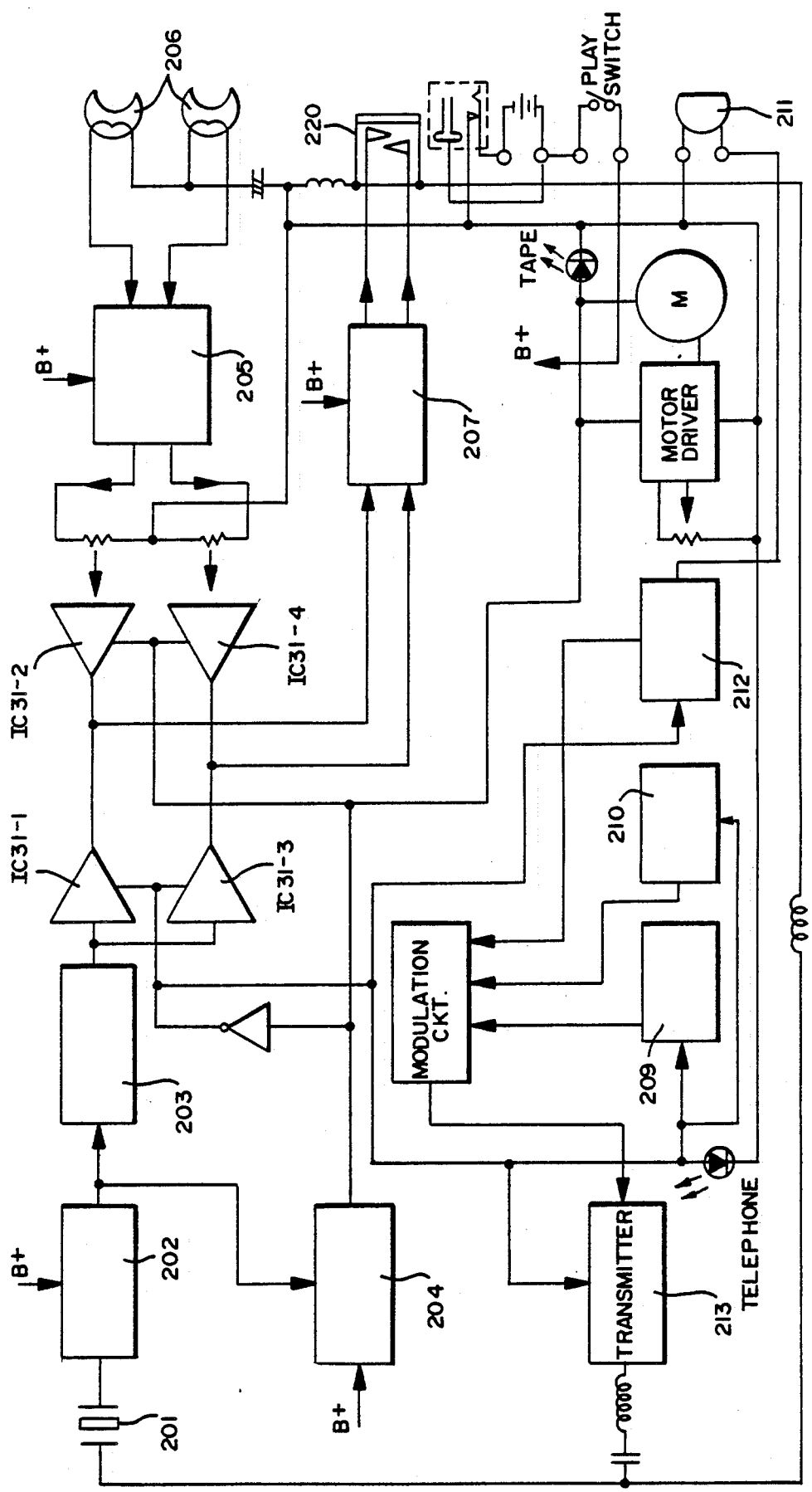
FIG. 2 is a block diagram of the circuit of the personal stereo unit of the present invention.
Figure 5:
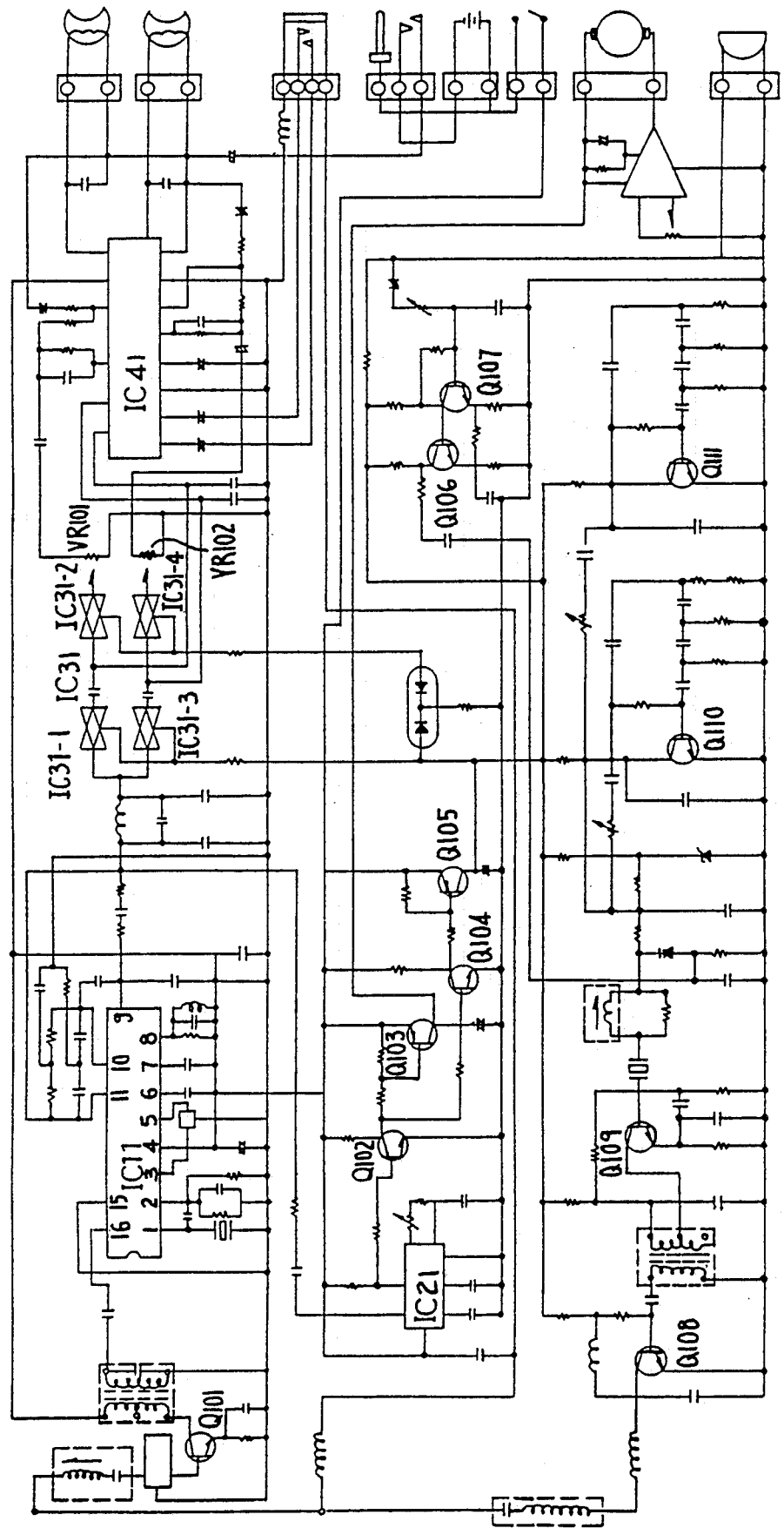
FIG. 5 is a practical example of the circuit of the personal stereo unit of the present invention.

Referring to FIGS. 2 and 5, the stereo cassette player portion of the present invention includes a filter 201 for carrier A. Filter 201 is a band pass filter which will not only increase the radio's rejection ratio against the adjacent channel but like filter 101, prevents interruption of carrier A by carrier B.

Filter 201 is connected to carrier A receiver 202, which includes a transistor Q101 and an integrated circuit IC11 as shown in FIG. 5. The radio frequency signal of carrier A is received firstly by the earphone line, which acts as an antenna and is amplified by transistor Q101, then linked with integrated circuit IC11, which performs frequency differentiation and detection to obtain the audio frequency signal. The output of receiver 202 is divided into two branches, one of which is connected to a pilot tone filter 203 and the other to a pilot tone decoder 204 within integrated circuit IC21.

The audio signal output by the integrated circuit IC11 of the receiver 202 is sent to the tenth pin of integrated circuit IC11 and output from the eleventh pin of IC11 after being filtered and amplified by the double T type filter and OP amplifier between the two pins. The audio signal is then linked with the integrated circuit IC21. If the frequency is correct, the 8th pin of the integrated circuit IC21 is transformed from high electric potential into low electric potential to control the action of the integrated circuit IC31.

As shown in FIGS. 2 and 5, the stereo cassette player includes an audio preamplifier 205 constituted by a portion of integrated IC41. Preamplifier 20 performs pre-amplification for the musical signal picked up by the magnetic head 206 from a recording tape. The musical signal is sent to integrated circuit IC31 after its volume has been adjusted by the variable VR101 and VR102.

Integrated circuit IC41 is the main body constituting the audio frequency preamplifier 205 and also the audio power amplifier 207. Consequently, the musical signal output from the audio preamplifier 205 will be sent back via the variable resistors VR101 and VR102 and the integrated circuits IC31-2 and IC31-4 to the audio frequency amplifier 207 within IC41 to be amplified and then drive the earphone 220.

However, when the frequency of the pilot signal to be transmitted from the base unit and received by the integrated circuit IC21 is the same as that of the audio decoder 204, indicating a telephone call, the 8th pin of IC21 changes to a low electric potential, and the integrated circuit IC31 is controlled by the collectors of the transistors Q102, Q103, Q104 and Q105 to make the integrated circuits IC31-2 and IC31-4 open and cut off the musical sound.

At this time, the integrated circuits IC31-1 and IC31-3 are caused to open and the audio signal sent out from the integrated IC11 is passed through IC31 and then amplified by IC41 to drive earphone 220. Also, the transistors Q110 and Q111 start to oscillate in order to provide signals for the pilot tone oscillators 209 and 210, and signals from microphone 211 are amplified by transistors Q101 and Q107 and sent out after being modulated, thus enabling a two-way telephone conversation to occur via the telephone and earphones.

Figure 3:
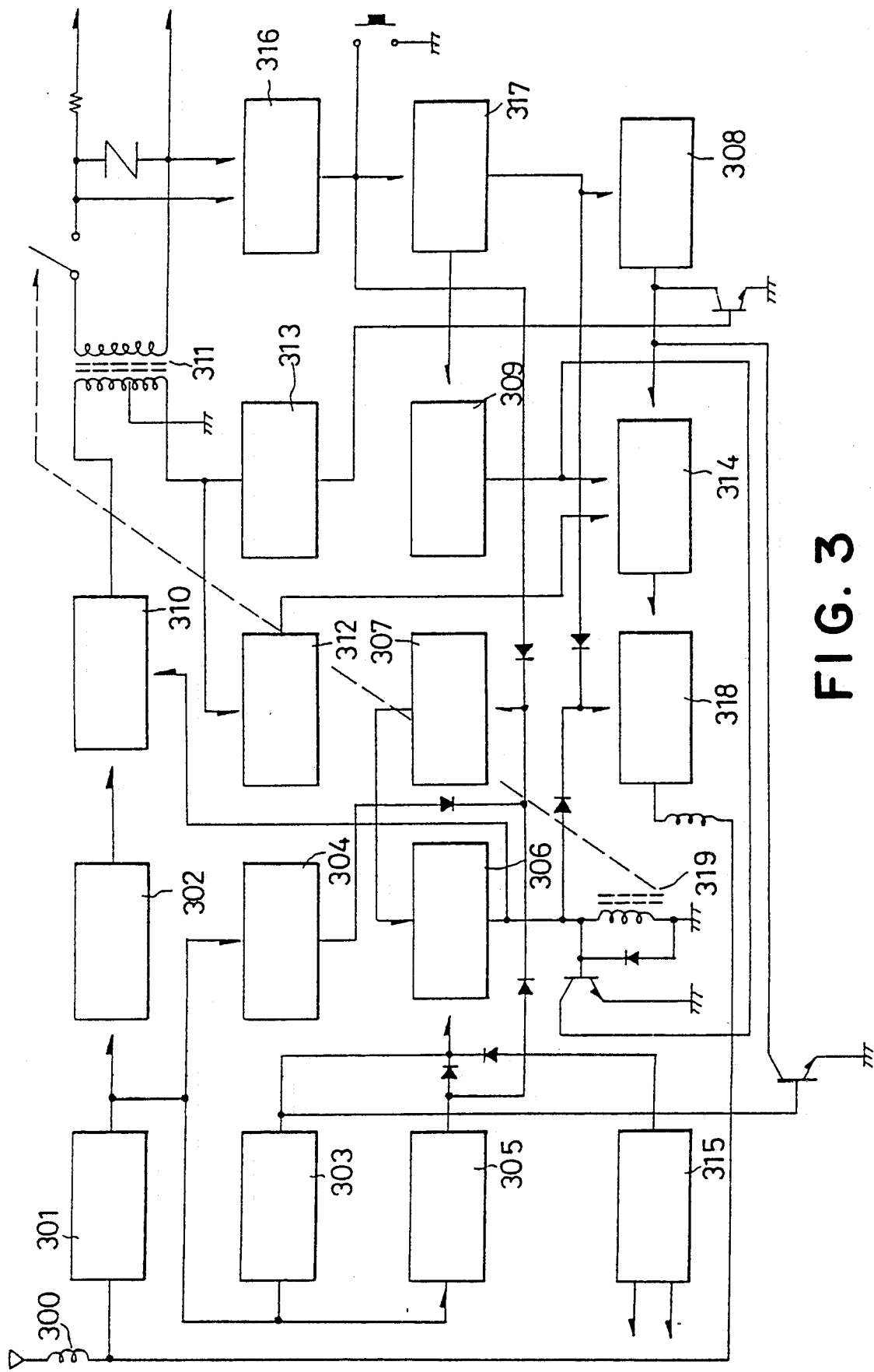
FIG. 3 is a block diagram of the circuit of the base of the present invention.
Figure 6:
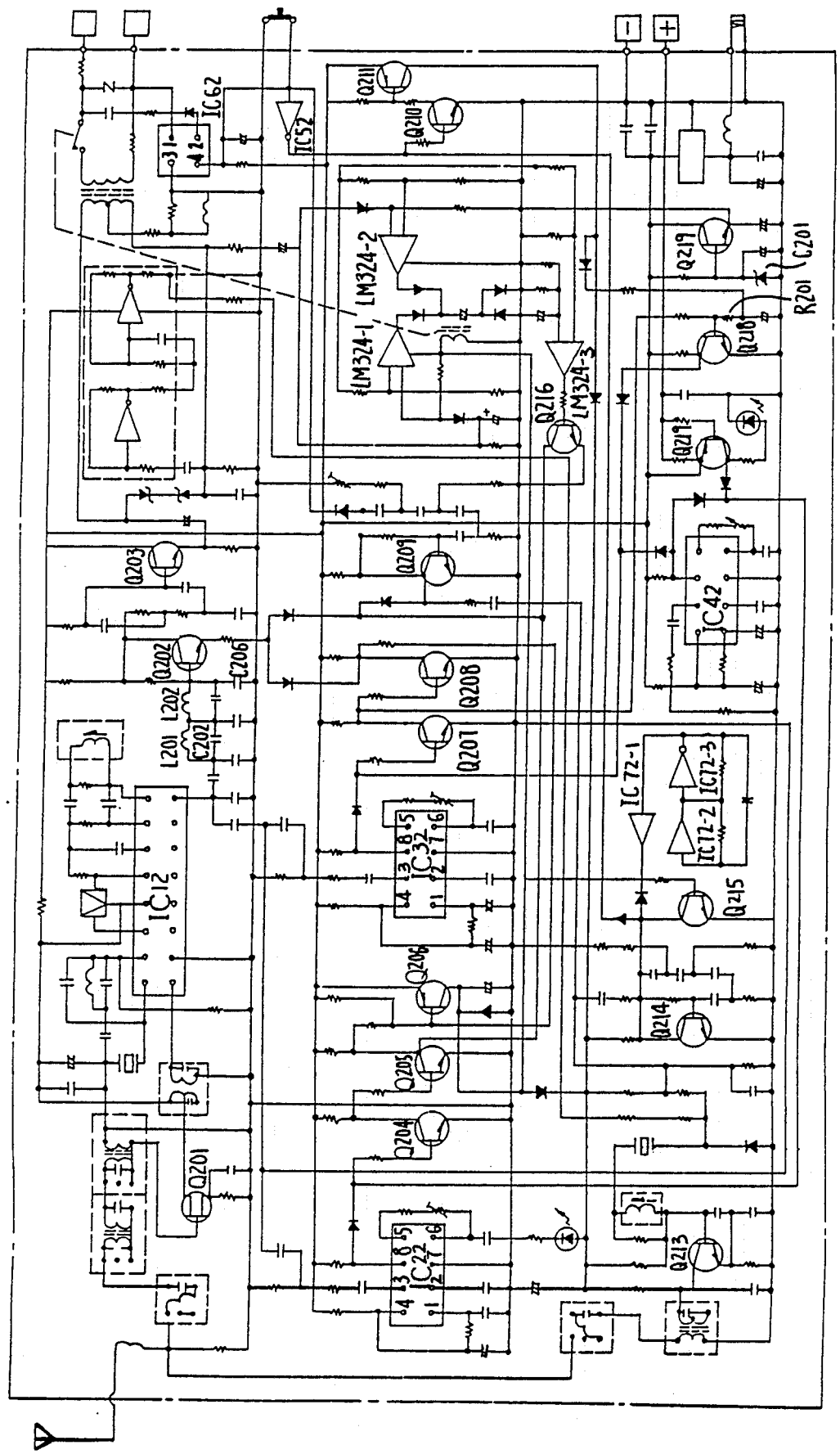
FIG. 6 is a practical example of the circuit of the base unit of the present invention.

Referring to FIGS. 3 and 6, the base unit of the present invention includes a receiver 301 for a carrier B input from antenna 300. Receiver 301 includes integrated circuit IC12. The emitting frequency of carrier B is passed from antenna 300 to transistor Q201 after being filtered and undergoing frequency differentiation and detection in integrated circuit IC12 in order to attain the audio signal.

The output of receiver 301 is divided into two branches, one of which is connected to pilot tone filter 302, and the other of which is connected to the pilot tone decoders 303, 304 and 305 constituted by the integrated circuits IC22, IC32 and IC42 respectively, in which the pilot tone decoder 305 is connected with the In Use Lock Circuit 306 and the cassette player lock circuit 307.

The In Use Lock Circuit 306 is constituted by transistors Q204, Q205 and Q206 and, as shown in FIG. 6, the cassette player lock circuit 307 is constituted by another set of transistors Q207, Q208 and Q209, which control the pilot tone oscillator 308 and the bell signal oscillator 309. The audio signal output by the integrated circuit IC12 is decoded by the integrated circuits IC22, IC32 and IC42 of the pilot tone decoders 303, 304 and 305. As a result, if the eigth pins of the integrated circuits IC22 and IC32 are both in low potential, the following occurs: the hand set unit is in the state of talking; the In Use Lock Circuit is locked up; the service line is connected; and the pilot tone oscillator 308 is cut off.

If the eighth pins of the integrated circuits IC32 and IC42 are both in low potential, the cassette player lock circuit 307 will be locked up and the service line connected simultaneously. As for the In Use Lock Circuit 306 formed by transistors Q204, Q205 and Q206, when the eigth pins of the integrated circuits IC22 and IC42 are in low potential, the transistor Q204 opens, the transistor Q205 becomes conductive, and the transistor Q206 outputs a positive voltage to supply bias voltages to the transmitting circuit, audio frequency microphone and the receiver amplifier. The transistor Q205 and Q215 cut off the pilot tone oscillator 308 and the audio frequency oscillator 309 to complete the radio telephone bi-directional talking network.

Turning to the cassette player lock circuit formed by the transistor Q207, Q208 and Q209, once there is a bell signal, the collector of the transistors Q211 will output a high electric potential and the transistor Q218 (collector) is transformed into low electric potential such that, once the base unit receives the frequency of the pilot tone oscillators B and C transmitted by the stereo after being compared by the integrated circuits IC32 and IC42, if their eighth pins are both in low electric potential, the resistor Q207 will open and transistor Q208 will consequently remaim closed. At this time, the transistor Q207 is locked up and maintains an open circuit, the transistor Q208 is conductive, and the transistor Q206 outputs a positive voltage, thus forming a radio talk network.

Pilot tone filter 302 is a low pass filter formed by inductors L201, L202 and capacitors C201 and C206, which are used to filter the pilot tone in order to prevent the signal from being leaked into the service. As shown in FIGS. 3 and 6, the output of the pilot tone filter 302 is connected with the audio transmitter output amplifier 310 formed by transistors Q202 and Q203. The speaking sound of the user, which is demodulated by the carrier signal B, is coupled with the service line by the output transformer 311 after being filtered by the pilot tone filter 302 and amplified by the audio microphone 310.

The secondary winding of the output transformer 311 is connected to the on hook detector 313 and the audio receiver amplifier 312, and the output of the audio receiver amplifier 312 is connected to modulation circuit 314, the signal coming from the service line being coupled with the output transformer 311, amplified by the audio receiver 312, and then linked to the modulation circuits 314.

In addition, as shown in FIGS. 3 and 6, the base unit includes a charge detector 315 constituted by the transistor 217. While the hand set unit is connected to the base unit for charging, a positive electric potential is output by the collector of the transistor Q217 to force the collector of the transistor Q204 to a high electric potential, cutting off the in use lock circuit and returning it to the preparatory state.

The service line is connected with the photocoupler 316, which is a photocoupling integrated circuit. Once the bell signal enters the photocoupler, the fourth of this integrated circuit will be transformed into a low electric potential. The output of the photocoupler 316 is connected with the TX power enable switch 317 constituted by integrated circuit IC52 and transistors Q210 and Q211.

When the fourth pin of the photocoupler integrated circuit IC62 of the photocoupler 316 is in the low electric potential, a high electric potential is output from the collector of transistor Q211 after passing through the integrated circuit IC52 and the transistor Q210. As a result, bias voltage is supplied to the carrier A transmitter 318, modulation circuit 314, bell signal oscillator 309 and the pilot tone oscillator 308. Pilot tone oscillator 308 is an RC phase shifting oscillator constituted by the transistor 209. The bell oscillator 309 forms a dual tone signal by combining the 1.95 Hz signal generated by the oscillation of the transistor Q214 and the 20 Hz signal generated by the oscillation of the integration circuits IC72-1, IC72-2 and IC72-3.

When the collector of transistor Q206 of the in use lock circuit 306 or the transistor Q211 of the cassette player lock circuit 207 outputs a positive electric potential to supply bias voltages to the carrier A transmitter 318 and the modulation circuit, transmitter 318 will oscillate carrier A and transmit it through antenna 300. When the telephone receiver is hung up, the service line generates a pulse which is coupled by output transformer 311 and processed by amplifiers LM324-1, LM324-2, and a high electric potential is output by amplifier LM324-3. Transistor Q216 then causes pilot tone oscillator 308 to open, and the cassette player returns to the musical state because it does not receive a signal from pilot tone oscillator 308. The base unit returns to its preparatory state upon being unable to receive the signal of the pilot tone decoders 304 and 305.

The operation of the stereo/telephone of the present invention will now be described:

A. Operation of the hand set unit and the base unit.
1. Taking a telephone call.

When a ring is received from the service line, the output end of photocoupler 316 in the base unit is transformed from a high electric potential into a low electric potential and transmitting circuit 302, bell signal oscillator 309 and pilot tone (D) oscillator 308 start to operate.

After receipt of the carrier A signal, the hand set unit receiver 101 demodulates the bell signal and the pilot tone signal. The bell signal is amplified by bell signal amplifier 107 after being filtered by bell signal filter 105, causing buzzer 115 to ring and indicate that there is a telephone call.

In order to use the handset unit to carry out a telephone conversation, the user need only turn the talk and power switch 116 from the position ON to the position TALK, at which time the pilot tone oscillators 108 and 109 will start to oscillate, and the carrier B signal will be transmitted by transmitter 110.

After the receiver 301 of the base unit receives the carrier B signal from the handset unit, the signal is demodulated and sent to the pilot tone decoders 303 and 305, respectively, and compared with the decoders' own oscillating frequencies. Once the frequencies are determined to be the same, the decoders' output is transformed to cause the in use lock circuit to be locked up and send out an 8Volt electric potential to the relay. The service line is then connected and the pilot tone oscillator 308 closed.

Subsequently, the sound of the user is transmitted via carrier B from the microphone 114 of the hand set unit and the microphone amplifier 112. The receiver 301 of the base unit demodulates the user's voice signal and it is sent to the audio microphone amplifier 310 and amplified.

The sound of the party at the other end of the line is coupled with the service line via the ouput transformer 311 and sent to the audio receiver amplifier 312 to be amplified. The signal is then transmitted by A transmitting circuit 318, demodulated by the receiver 101 of the hand set unit, and sent to the audio preamplifier 103 and audio power amplifier 104 for amplification. The sound is the given by the speaker 106 to complete a bi-directional radio telephone conversation.

2. Placing a telephone call.

To intiate a call, the talk switch 116 of the hand set is turned to the TALK position, at which time the pilot tone oscillators 108 and 109 begin to oscillate, and the signal is transmitted via the carrier B transmitter 110. After carrier B is received, the base unit receiver 301 demodulates it and sends it to the pilot tone decoders 303 and 304, respectively, which compare the demodulated frequencies with their own frequencies. If the frequencies are the same, the output is transformed to cause the in use lock circuit to be locked up to complete the connection.

The user is then able to dial. If pulse dialing is used, the TT/DP switch is turned to the position DP. Upon dialing, the dial integrated circuit will cut off the signal of the pilot tone oscillator 109 a number of times equal to the number dialed. For example, if two is dialed, the pilot tone will be cut off twice. Because the pilot tone signal received by the base unit has been cut off twice, the service line will also be on and off twice to complete the pulse dialing action.

When touch tone dialing is required, the TT/Dp switch must be turned to the position TT. Upon dialing, an audio signal is generated in the dialing integrated circuit IC2, and transmitted via carrier B and demodulated by the base unit, whereupon it is coupled with the service line by the output transformer after being amplified by the audio microphone amplifier 310.

B. Interaction between the stereo and base unit.

When there is a ring in the service line, the output of the photocoupler 316 is transformed from high electric potential into low electric potential, and the base unit transmits the pilot tone signal and the dual tone bell signal via the carrier A transmitter 302. If the stereo cassette player unit is playing, receiver 202 of the stereo unit demodulates both signals and pilot tone decoder 204 compares them with their own oscillation frequencies.

The output of the pilot tone decoder 204 is originally at a high electric potential, and the integrated circuits IC31-2 and IC31-4 of the integrated circuit IC31 are therefore in a conducting state and the sound to be heard in the earphone is from the tape being played. However, after the demodulated signals are compared by the pilot tone decoder and found to be the same frequency, the output is transformed into a low electric potential, and the tape drive motor M will stop immediately.

Because the integrated circuits IC31-1 and IC31-3 of the integrated circuit IC31 are conductive at this time, IC31-2 and IC31-4 are cut off to form an open circuit, the pilot tone oscillators 210 and 209 begin to oscillate, and a signal is transmitted via the carrier B transmitter.

When receiver 301 of the base unit receives carrier B, it will demodulate the pilot tone signal transmitted by stereo cassette player unit. If the pilot tone oscillators 209 and 210 compare and determine that the frequencies are the same as their own oscillation frequencies, the output is transformed and causes the cassette player lock circuit 307 to be locked up.

Relay 319 is then switched to connect the service line and cut off the ringing. As a result, the sound heard in the earphone 220 at this time comes from the service line, after being transmitted by base unit transmitter 318, via the base unit output transformer and audio receiver amplifier 312. When receiver 202 receives carrier A, it is demodulated, amplified by audio power 207, and finally converted into audible sounds by earphone 220.

The speaking voice of the user will be transmitted by the carrier B transmitter via the microphone 211 and the microphone amplifier 212, after which the receiver 202 of the base unit demodulates and sends it to the audio microphone amplifier where it is amplified and then coupled with the service line via the output transformer 311.

When the party at the other end of the line hangs up, the on-hook detector 313 of the base unit outputs a high electric potential within one second or so to cut off the pilot tone. At this time, the transmitting circuit of the hand set unit opens and is unable to receive any signal of the pilot tone oscillator 308, which will return to its original state in order for the recording tape to operate.

As the motor M restarts, the sound emitted from the earphone returns to sound from cassette player. In the meantime, the lock circuit 307 of the base unit opens upon failure to receive the pilot tone transmitted by the cassette player unit, the relay 319 also returns to the open state, so that the entire system returns to its original state.

The above operation of the present invention enables it to prevent the user from failing to answer a telephone call while listening to a stereo recording through an earphone, and therefore is both practical and novel. Although the present invention has been described with a certain degree of particularity, the present disclosure has been made by way of example, and changes in details of structure may be made without departing from the spirit of the invention, as defined by the amended claims.

I claim:

1. A portable tape player and radio telephone system, comprising a telephone base unit, a telephone handset unit and tape player,
    said tape player including a receiver having means for receiving a carrier signal transmitted from the base unit, and means for demodulating the carrier signal; pilot signal filter means for filtering the demodulated signal; pilot signal decoder means for comparing a frequency of the demodulated signal with a frequency of a pilot signal decoder; a tape drive motor; means for stopping said tape drive motor if the demodulated signal frequency matches said frequency of the pilot signal decoder; a set of pilot signal oscillators; means for causing said pilot signal osscillators to oscillate upon stoppage of said tape drive motor; a microphone and microphone amplifier means for causing a signal from said microphone to be amplified and modulated by an output signal of said set of pilot signal oscillators; and means for transmitting said modulated signal from said tape player to said base unit,
    said base unit including a receiver having means for receiving a carrier signal transmitted from said tape player and means for demodulating said carrier signal; pilot signal filter means for filtering the demodulated signal transmitted from the tape player; pilot signal decoder means for comparing a frequency of the demodulated signal transmitted from the tape player with a frequency of a pilot signal decoder; a tape player lock circuit; means for locking up the tape player lock circuit if the frequency of the demodulated signal transmitted from the tape player is the same as the frequency of the pilot signal decoder; a relay switchable between a service line and the tape player lock circuit; means for switching the relay to connect the service line with the tape player lock circuit; and transmitter means for transmitting a signal from said service line to said tape player; such that said signal from said service line is demodulated and played through said tape player.

2. A system as claimed in claim 1, said base unit further comprising an on hook detector including means for cutting off a pilot signal, causing said tape drive motor to resume operation, causing the tape player lock circuit of the base unit to open, and causing said relay to open when a party at another end of a telephone line hangs up.

3. A system as claimed in claim 1, further comprising means for causing the speaking voice of a user to be transmitted by the transmitter of the player via the microphone and microphone amplifier means of the tape player, and means in said base unit for demodulating the speaking voice; audio microphone amplifier means for amplifying the demodulated voice signal; and means for coupling said service line to said amplifier means via an output transformer.

4. A system as claimed in claim 1, said base unit further comprising a hook detector including means for outputting a high electric potential to cut off the tape player pilot signal; means for causing a transmitting circuit of the handset unit to open upon failure to receive the pilot signal; means for causing the motor to restart upon opening of the handset unit transmitting circuit; means for opening the tape player lock circuit of the base unit upon failure to receive the pilot signal; and means for causing said relay to return to an open state upon failure receive the pilot signal, thereby returning said system to its original state.

* * * * *